US012734786B2

(12) United States Patent
Manickam

(10) Patent No.: US 12,734,786 B2
(45) Date of Patent: Sep. 15, 2026

(54) THERMAL INSULATING MEMBER FOR A VEHICLE COMPONENT

(71) Applicant: VOLVO TRUCK CORPORATION, Gothenburg (SE)

(72) Inventor: Kumaravel Manickam, Ramamurthy Nagar (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 116 days.

(21) Appl. No.: 18/559,858

(22) PCT Filed: Jul. 13, 2021

(86) PCT No.: PCT/EP2021/069435
§ 371 (c)(1),
(2) Date: Nov. 9, 2023

(87) PCT Pub. No.: WO2023/284945
PCT Pub. Date: Jan. 19, 2023

(65) Prior Publication Data
US 2024/0227355 A1 Jul. 11, 2024

(51) Int. Cl.
*B32B 15/04* (2006.01)
*B32B 3/26* (2006.01)
(Continued)

(52) U.S. Cl.
CPC ............ *B32B 15/046* (2013.01); *B32B 3/263* (2013.01); *B32B 15/18* (2013.01); *B32B 15/20* (2013.01);
(Continued)

(58) Field of Classification Search
CPC ....... B32B 15/046; B32B 15/18; B32B 15/20; B32B 2266/126; B32B 2307/304;
(Continued)

(56) References Cited

U.S. PATENT DOCUMENTS

2013/0056299 A1 3/2013 Choi
2018/0245515 A1* 8/2018 Roach ..................... B32B 5/245
2018/0320824 A1* 11/2018 Fay ......................... B32B 3/266

FOREIGN PATENT DOCUMENTS

DE 102008036894 A1 2/2010
EP 2703614 A1 3/2014
WO 2005091902 A2 10/2005

OTHER PUBLICATIONS

International Search Report and Written Opinion of the International Searching Authority in corresponding International Application No. PCT/EP2021/069435 mailed Apr. 19, 2022 (13 pages).

* cited by examiner

*Primary Examiner* — Hai Vo
(74) *Attorney, Agent, or Firm* — Jeffri. A. Kaminski; Venable LLP

(57) ABSTRACT

A thermal insulating member includes a multilayer complex having first layer which is made of a hydrophobic aerogel; a second layer which is made of a fiber wool; and a metallic foil, called outer layer. The thickness of the first layer decreases along a variability direction of the multilayer complex. The thermal insulating member can be arranged around a vehicle component which extends in a longitudinal direction and which has a first end at a first temperature T1 and a second end at a second temperature T2 lower than T1, in use. In the mounted state, the variability direction of the multilayer complex is parallel the longitudinal direction of the vehicle component and the greatest thickness of the first layer is closer to the first end.

19 Claims, 3 Drawing Sheets

(51) Int. Cl.
*B32B 15/18* (2006.01)
*B32B 15/20* (2006.01)

(52) U.S. Cl.
CPC ... *B32B 2266/126* (2016.11); *B32B 2307/304* (2013.01); *B32B 2307/73* (2013.01); *B32B 2307/7376* (2023.05); *B32B 2311/24* (2013.01); *B32B 2311/30* (2013.01); *B32B 2315/14* (2013.01); *B32B 2597/00* (2013.01); *B32B 2605/00* (2013.01)

(58) Field of Classification Search
CPC ........ B32B 2307/73; B32B 2307/7376; B32B 2311/24; B32B 2311/30; B32B 2315/14; B32B 2597/00; B32B 2605/00; B32B 3/263; F01N 13/102; F01N 13/14; F01N 13/148; F01N 13/16; F01N 2260/08; F01N 2510/02; F01N 3/00; F01N 3/2864; Y02A 50/20; Y02T 10/12
See application file for complete search history.

Fig. 1
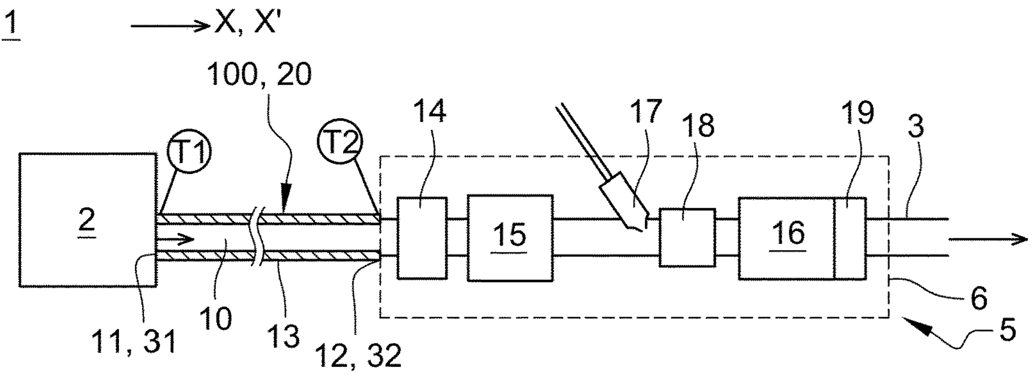
Fig. 2
100, 20
13
24
X, X'
22
III
10
Fig. 3
Z
100, 20
24
23
22
21
13
10
X, X'
Fig. 4
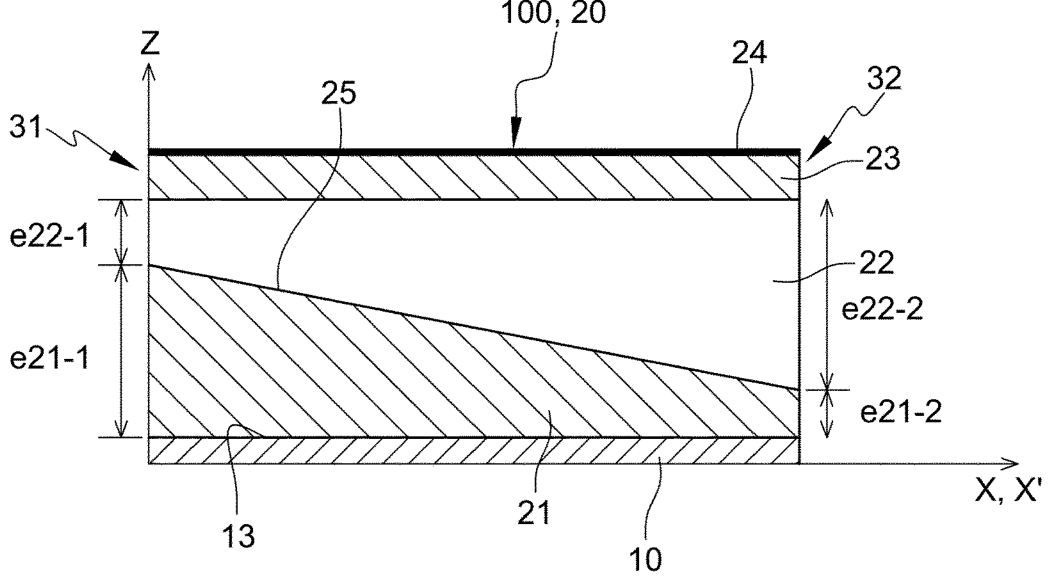

Fig. 5
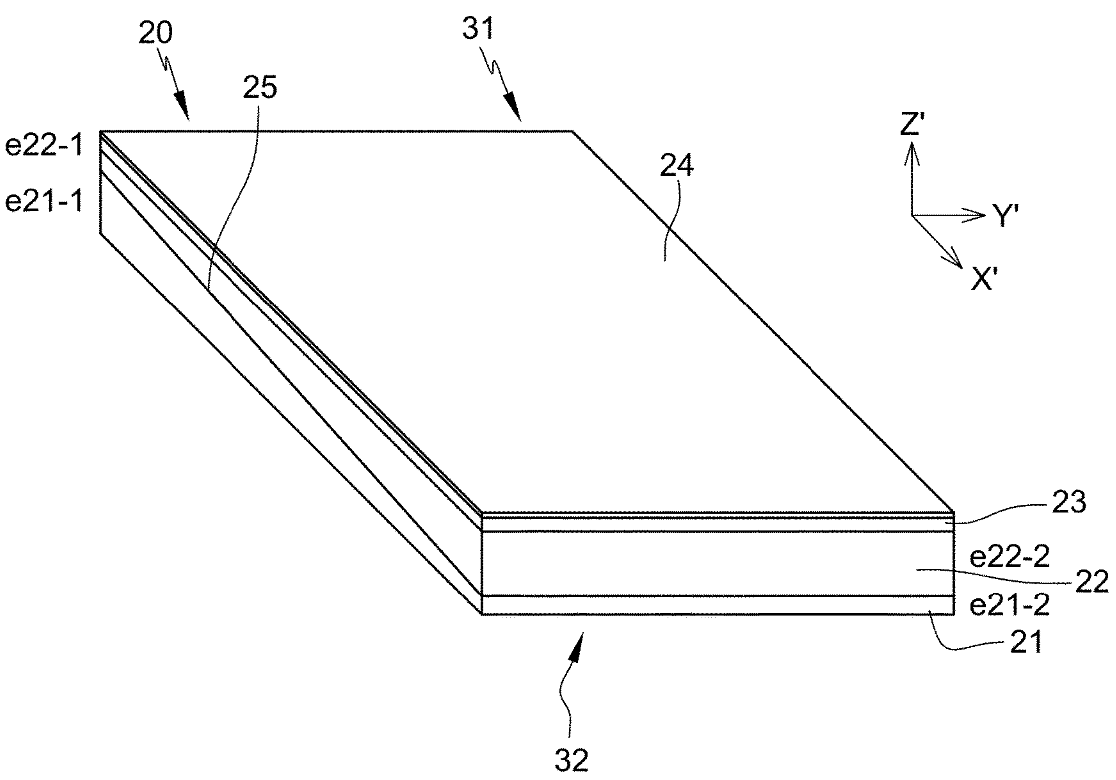
Fig. 6
Fig. 7
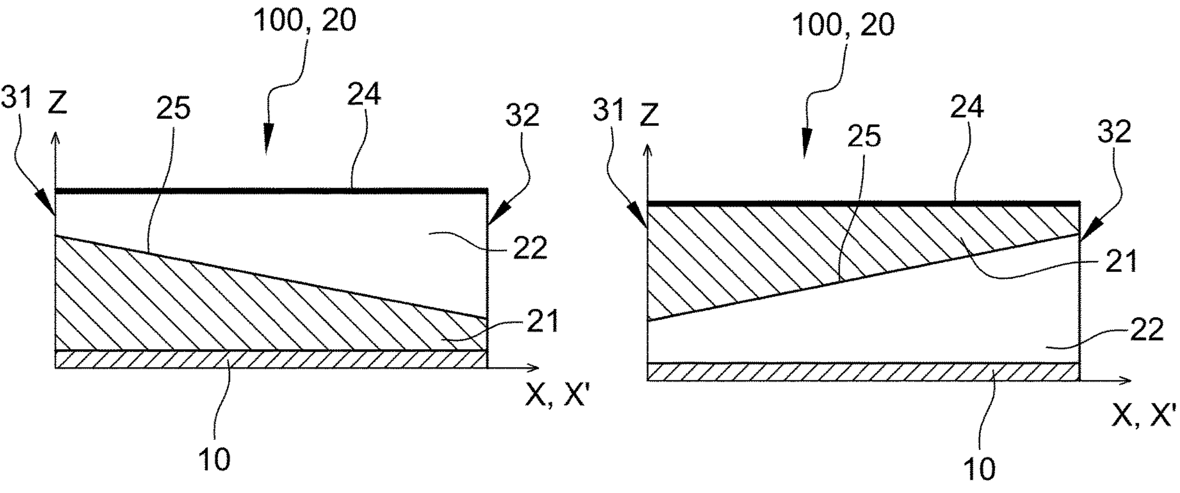

100, 20
25
24
31
Z
32
22
21
X, X'
10

100, 20
25
24
31
Z
32
22
21
X, X'
10

P1
100, 20
P2
Z
24
32
31
22
21
X, X'
25
10

P1
100, 20
P2
P3
31
Z
24
32
22
21
X, X'
25
10

100, 20
Z
P1
P2
24
32
31
22
21
X, X'
25
10

100, 20
Z
P1
24
P2
32
31
22
21
X, X'
25
10

THERMAL INSULATING MEMBER FOR A VEHICLE COMPONENT

CROSS-REFERENCE TO RELATED APPLICATIONS

This application is a U.S. National Stage application of PCT/EP2021/069435, filed Jul. 13, 2021 and published on Jan. 19, 2023, as WO 2023/284945, all of which is hereby incorporated by reference in its entirety.

TECHNICAL FIELD

The invention relates to a thermal insulating member for a vehicle component.

The invention can be applied in light, medium and heavy-duty vehicles, such as trucks, buses and construction equipment.

BACKGROUND

Exhaust gases formed in the combustion of fuel in an internal combustion engine may contain a proportion of undesirable components. To reduce air pollution, vehicles are therefore equipped with various treatment devices that deal with undesirable substances in exhaust gases.

One known example of an exhaust gas treatment system includes several devices such as an oxidizing catalyst device, a particulate filtering device and a selective catalytic reduction (SCR) device. These devices may be arranged in a same housing which is fastened to the vehicle chassis. This housing is generally called a "muffler".

In the emission reduction process, many chemical reactions occur within the muffler boundaries. The efficiency of these chemical reactions is highly dependent on the temperature. In particular, a minimum temperature of 200° C. is required. Moreover, depending on the temperature, the efficiency may vary from 50% to 95%.

In some conditions, the exhaust gases temperature can be too low to ensure an appropriate operation of the exhaust gas treatment system. This can occur for example in cold weather (for example when the outside temperature is lower than −10° C.) and/or high vehicle speed (above 70 km/h for instance). This is exacerbated by the fact that the pipe between the engine and the muffler is fairly long (typically more than 2 m), resulting in significant thermal energy loss. The exhaust gases temperature can be further reduced by other factors, which may result from several technologies implemented in the engine and exhaust assembly. In particular, the use of turbocompound engines causes a temperature drop upstream from the muffler, due to the increased surface contact of the exhaust mass; besides, urea injection and more specifically double urea injection solutions causes an additional temperature drop in the muffler, upstream from the SCR device.

A too low temperature at the muffler inlet results in low efficient chemical reactions. This not only impedes the exhaust gas treatment system performances, but also entails other issues, such as a quicker clogging of the filtering device, which therefore requires more frequent regeneration.

It is therefore of paramount importance to keep the exhaust gases temperature as high as possible at the muffler inlet, to maintain the exhaust gas treatment system performance at a satisfactory level.

To reduce the temperature drop of the exhaust gases carried in the pipe between the engine and the muffler, said pipe is conventionally insulated. However, current insulating solutions are not fully satisfactory as there remain a significant temperature drop upstream from the muffler, unless very expensive solutions are implemented.

It therefore appears that there is room for improvement in this respect.

SUMMARY

An object of the invention is to provide a solution for improving the thermal insulation of a vehicle component as compared to the prior art solutions.

According to a first aspect, the invention relates to a thermal insulating member, in particular for a vehicle component, comprising a multilayer complex having

- a first layer which is made of a hydrophobic aerogel;
- a second layer which is made of an insulating material that has small bubbles or pockets of gas trapped in a fibrous or a foam-like structure;
- a metallic foil, called outer layer;

the multilayer complex defining a depth direction across the layers;

wherein the thickness of the first layer decreases along a variability direction of the multilayer complex which is orthogonal to the depth direction, at least over part of the dimension of the multilayer complex along said variability direction.

Thus, the invention uses a combination of two materials to benefit from their respective advantages.

The hydrophobic aerogel of which the first layer which is made is a material having a very low thermal conductivity as compared to any known solid material. This thermal conductivity can be in the range of 12 to 20 mW/(m-K) at atmospheric pressure and at 100° C. Other advantages of the aerogel include: resistance to high temperatures (it can be used at a temperature up to 650° C. for instance); breathability; fungal resistance; corrosion resistance; low aging due to heat and vibration; ultra-low weight.

Providing an aerogel which is hydrophobic facilitates preventing water from entering the thermal insulating member even if the second layer is not hydrophobic. This prevents water from being held in the multilayer complex, which would entail increased weight and corrosion of the vehicle component over time.

As regards the second layer, it has a higher thermal conductivity than aerogel but is significantly less expensive. Thus, the second layer provides thermal insulation, even if not to the same extent as the first layer, while allowing the price of the thermal insulating member to remain within a range acceptable for the customer.

Moreover, owing to the variable thickness of the first layer, the invention makes it possible to adapt the thermal insulation provided to the needs of a concerned area of the vehicle component, without unnecessarily increasing the cost of the thermal insulating member. In other words, a portion of the thermal insulating member with a thick first layer can be implemented in areas of the vehicle component where a significant thermal insulation is required, while another portion of the thermal insulating member with a thinner first layer can be implemented in areas of the vehicle component where less thermal insulation is required, therefore allowing savings.

When mounted on a pipe carrying exhaust gases from a vehicle engine to an exhaust after treatment system—or to another vehicle component in which the temperature decreases along a longitudinal direction—the thermal insulating member according to the invention, with a first layer having a decreasing thickness, can provide an adapted thermal insulation depending on the considered location along the pipe. More specifically, the thermal insulation provided may be all the more significant as the temperature of the vehicle component—or here the exhaust gases flowing in the vehicle component—is high.

The invention therefore allows achieving a compromise between insulation performance and cost.

In an embodiment, the first layer thickness can decrease by 20%, or by 30%, or by 50%, over a length—along the variability direction—which corresponds to the length of the thermal insulating member when installed on the vehicle component.

The structure of the thermal insulating member (i.e. layout and thickness of the layers) may be identical in any plane parallel to the variability and depth directions. The thermal insulating member may be made of said multilayer complex.

In an embodiment, the second layer is arranged between the first layer and the outer layer. The first layer can then form one face of the multilayer complex, which is opposite the face of the multilayer complex formed by the outer layer, i.e. the metallic foil. These three layers may be contiguous; alternatively, they may not be contiguous, in case there is provided at least one additional layer in the multilayer complex.

The opposite configuration, wherein the first layer is arranged between the second layer and the outer layer, can also be envisaged.

In an embodiment, the thickness of the second layer increases in the same way as the thickness of the first layer decreases, along the variability direction, such that the overall thickness of the set comprising the first layer and the second layer is substantially constant. Preferably, the overall thickness of the multilayer complex is substantially constant.

The first layer may comprise one or several portions. In this context, the term "portion" is used for a part of the first layer which is comprised between two points along the variability direction, or between two planes orthogonal to the variability direction.

Thus, the first layer may comprise any of, or any combination of:

- a portion in which its thickness decreases continuously along the variability direction, whereby in said portion the first layer comprises a face forming a slope without steps;
- a portion in which its thickness decreases constantly along the variability direction, whereby in said portion the first layer comprises a face forming a tilted plane;
- a portion in which its thickness is substantially constant along the variability direction;
- a portion in which its thickness decreases by increments, along the variability direction, whereby in said portion the first layer comprises a face forming at least one step.

Among possible embodiments, along the variability direction of the multilayer complex, the first layer may have at least one portion with a substantially constant first thickness, and:

- at least one portion where its thickness decreases
- or at least one portion where its thickness is substantially constant but lower than the first thickness.

In an embodiment, at least one portion of the multilayer complex, the thickness of the first layer is zero or the thickness of the second layer is zero. Said portion can typically be at one end of the multilayer complex along the variability direction.

The second layer may be made of a mineral wool, such as a glass wool or fiber wool; the metallic foil may be an aluminium foil or a stainless steel foil.

In an embodiment, the multilayer complex further comprises a third layer made of a hydrophobic aerogel, the second layer being arranged between the first layer and the third layer. The third layer may have a substantially constant thickness. In a non-limiting embodiment, the third layer is arranged between the second layer and the metallic foil.

The hydrophobic aerogel of the first and/or the third layer may be a silica gel. Such a material has a particularly low thermal conductivity, which may be around 12 mW/(m-K) at atmospheric pressure and at 100° C.

The thermal insulating member may be flexible so as to be wrapped around the vehicle component. Alternatively, the thermal insulating member may be formed as a shell—for example a rigid shell—configured to be placed around the vehicle component. Such a shell may have an inner face having a shape similar to the shape of the outer face of the vehicle component.

According to a second aspect, the invention relates to an assembly comprising:

- a vehicle component having a first end and a second end opposite the first end along a longitudinal direction X, wherein, in use, the first end has a first temperature T1 and the second end has a second temperature T2 lower than T1;
- a thermal insulating member as previously described, which is arranged around the vehicle component with the outer layer oriented outwardly and so that the variability direction of the multilayer complex is parallel the longitudinal direction X and the greatest thickness of the first layer is closer to the first end.

Thus, as previously explained, this allows providing a thermal insulation which is all the more significant as the temperature of the vehicle component is high, and consequently to lower the overall thermal loss while keeping costs down.

Along the longitudinal direction X, the multilayer complex comprises a first end on the side of the first end of the vehicle component (but not necessarily adjacent to said vehicle component first end) and a second end on the side of the second end of the vehicle component (but not necessarily adjacent to said vehicle component second end). According to an embodiment of the assembly:

- at the first end of the multilayer complex, the thickness of second layer is zero (i.e. there is no second layer, and the first layer may extend from the vehicle component to the outer layer);
- and/or, at the second end of the multilayer complex, the thickness of first layer is zero (i.e. there is no first layer, and the second layer may extend from the vehicle component to the outer layer.

The vehicle component can be a pipe, such as a pipe between an engine and an exhaust gas treatment system of the vehicle. With such an application, the invention ultimately highly improves the chemical performance of the exhaust after treatment system by increasing the temperature at the buffer inlet.

According to variants, the vehicle component could include: a heat shield around the vehicle exhaust after treatment system and engine, a cover over the turbo compound chargers.

According to a third aspect, the invention relates to a vehicle, in particular an industrial vehicle such as a truck, comprising an engine, an exhaust gas treatment system and an assembly as previously described, with the vehicle component being a pipe which carries exhaust gases flowing from the engine towards the exhaust gas treatment system.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic representation of a vehicle engine arrangement which comprises an engine and an exhaust gas treatment system, according to an embodiment of the invention;

FIG. 2 is a cross section of a pipe carrying exhaust gases between the engine and the exhaust gas treatment system of FIG. 1, the pipe being provided with a thermal insulating member comprising a multilayer complex;

FIG. 3 is an enlarged view of detail III of FIG. 2;

FIG. 4 is a schematic perspective view of an embodiment of the multilayer complex;

FIG. 5 is a cross section view of the multilayer complex of FIG. 4, in plane parallel to a variability direction and to a depth direction of the multilayer complex, the multilayer complex being arranged around the pipe;

FIGS. 6 to 13 are views similar to FIG. 5, showing alternative embodiments of the multilayer complex.

DETAILED DESCRIPTION OF EXAMPLE EMBODIMENTS OF THE INVENTION

Figure 8:
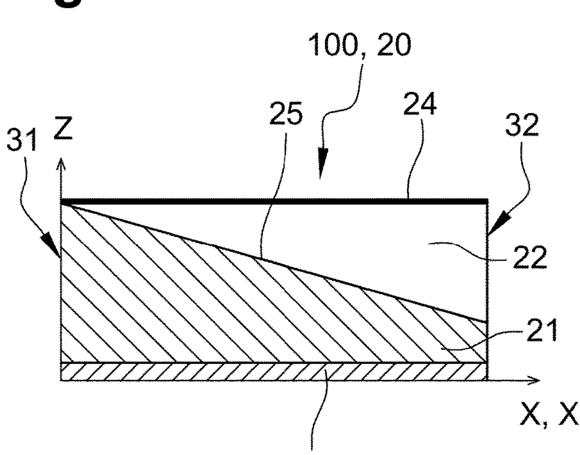

FIG. 1 schematically shows an engine arrangement 1 of a vehicle. The engine arrangement 1 comprises an engine 2, more particularly an internal combustion engine, such as a diesel engine.

The engine arrangement 1 further comprises an exhaust line 3 carrying exhaust gases flowing from the engine 2 towards the atmosphere, as well as an exhaust gas treatment system 5 arranged in the exhaust line 3 and fitted on a vehicle chassis. In the specification, for simplicity purposes, the term "system" when used alone refers to the exhaust gas treatment system.

The part of the exhaust line 3 which extends between the engine 2 and the system 5 is referred to as the pipe 10. The pipe 10 has a first end 11 connected to the engine 2 and a second end 12 connected to the system 5. The pipe 10 generally extends along a longitudinal direction X which corresponds to the vehicle longitudinal direction.

The system 5 comprises several devices intended to purify the exhaust gases flowing in the exhaust line 3 before they are released in the atmosphere, so that the so purified gases meet the applicable regulations. These devices may be arranged in a same housing 6, called a "muffler", which is fastened to the vehicle chassis.

According to a non-limiting embodiment, in the flow direction of the exhaust gases in the exhaust line 3, the system 5 can successively comprise:

- an oxidizing catalyst device 14, or Diesel Oxidation Catalyst. Such an oxidizing catalyst device 14 can be used to convert NO, CO and HC into $NO_2$, $CO_2$ and $CO_2$+$H_2O$, respectively, by means of $O_2$;
- a particulate filtering device 15, or filter, for retaining the particulate matter contained in exhaust gases and preventing it from being released to the atmosphere;
- a selective catalytic reduction (SCR) device 16 in which NOx can be converted essentially into water and nitrogen by means of ammonia used as a reductant. To that end, the system 5 further comprises an injector 17 by which a flow of gaseous ammonia can be supplied to the exhaust line 3 and mixed with the exhaust gases upstream from the SCR device 16. There may be provided a mixing chamber 18 downstream from the injector 17 and upstream from the SCR device 18, for mixing the exhaust gases and the gaseous ammonia before they enter the SCR device 18;
- an additional oxidizing catalyst device 19, or Ammonia Slip Catalyst, for controlling a possible ammonia slip.

In use, the first end 11 of the pipe 10 has a first temperature T1, and the second end 12 of the pipe 10 has a second temperature T2 lower than T1, because of the heat loss to the cooler ambient air around the pipe 10. The temperature of an area of the pipe 10 is generally substantially the same as the temperature of the exhaust gases in said area.

In order to ensure a good efficiency of the system 5, whatever the operating conditions, it is highly desirable that the exhaust gases entering the system 10 are hot enough for operation of the exhaust treatment devices. In other words, it is of paramount importance to minimize the heat loss from the pipe 10.

For that purpose, the invention provides a thermal insulating member 100 which is arranged around the pipe 10.

Although the invention is more specifically described with reference to an exhaust pipe, it is more generally directed to any vehicle component in which the temperature decreases along a direction, and where it is desired to maintain the temperature (in other words to slow the heat loss) as much as possible.

The thermal insulating member 100 comprises a multilayer complex 20 which may be in the form of a flexible sheet, as illustrated in FIG. 4. The sheet can be substantially flat in an unconstraint state, and can be wrapped around the pipe 10 and secured by appropriate fasteners (not shown).

The multilayer complex 20 comprises a first layer 21 which is made of a hydrophobic aerogel, such as a silica gel. The multilayer complex 20 also comprises a second layer 22 which is made of an insulating material that has small pockets or bubbles of gas trapped in a fibrous or a foam-like structure, such as a glass wool or fiber wool. The multilayer complex further comprises a metallic foil 24, also called outer layer, which can be an aluminium foil or a stainless steel foil.

As shown in FIG. 4, the multilayer complex 20 defines a depth direction Z' across the layers 21, 22, 24. Orthogonal to the depth direction Z' is defined a variability direction X'.

In case the multilayer complex 20 forms a substantially flat and rectangular sheet, as in FIG. 4, depth direction Z' is orthogonal to the main faces of the multilayer complex 20, and X' can be a longitudinal direction of the multilayer complex 20. A third direction Y', orthogonal to X' and Z', is then a transverse direction of the multilayer complex 20.

According to the invention, the thickness of the first layer 21 decreases along the variability direction X' of the multilayer complex 20, at least over part of the dimension of the multilayer complex along said variability direction X'.

In an embodiment, as shown in FIG. 4, the structure of the multilayer complex 20 (i.e. the layout and thickness of the layers) may be identical in any plane parallel to directions (X',Z'). In other words, in this embodiment, the cross-section of the multilayer complex 20 in a plane orthogonal to direction Y' is the same in any one of such planes.

As shown in FIGS. 3 and 5, the thermal insulating member 100 is arranged around the pipe 10 with the metallic foil 24 oriented outwardly, that is, positioned as the outermost layer, and so that the variability direction X' of the multilayer complex 20 is parallel the longitudinal direction X and the greatest thickness of the first layer 21 is closer to the pipe first end 11. Consequently, the thickness reduction of the first layer 21 along direction X corresponds to a drop of the exhaust gases/pipe temperature along direction X. In other words, as the temperature decreases, the insulation capacity provided by the thermal insulating member 100 decreases, insofar as the thickness of the material providing the higher insulation capacity decreases.

The multilayer complex 20 may be contiguous to an outer face 13 of the pipe 10.

Once arranged around the pipe 10, the multilayer complex 20 has a first end 31 located on the side of the pipe first end 11, and a second end 32 located on the side of the pipe second end 12, along the longitudinal direction X. In FIG. 1, the ends 31, 32 of the multilayer complex 20 are substantially coincident with the corresponding ends 11, 12 of the pipe 10, but this should not be considered as limiting; alternatively, the multilayer complex 20 could extend along only part of the pipe 10 in the longitudinal direction X. In FIG. 4, there is illustrated a sheet ready to be wrapped around the pipe 10, the sheet having first and seconds ends 31, 32; said sheet can result from the cut-out of a longer multilayer complex. The length of the pipe 10 that is wrapped in the multilayer complex 20 can be up to 3 or 3.5 m.

The thickness of the first layer 21 at the first end 31 of the multilayer complex 20 is denoted e21-1, and the thickness of the first layer 21 at the second end 32 of the multilayer complex 20 is denoted e21-2. Similarly, the thickness of the second layer 22 at the first end 31 of the multilayer complex 20 is denoted e22-1, and the thickness of the second layer 22 at the second end 32 of the multilayer complex 20 is denoted e22-2 (see FIG. 5 in particular).

The first layer thickness can decrease by 20%, or by 30%, or by 50%, from the first end 31 to the second end 32 of the multilayer complex 20. The thickness e21-1 of the first layer 21 at the first end 31 may be around 3 to 6 mm; the thickness e21-2 of the first layer 21 at the second end 32 may be around 1 to 5 mm. The maximum thickness of the first layer may be in the range of 3 to 6 mm.

The maximum thickness of the second layer 22 may be in the range of 3 to 6 mm.

In embodiments, such as the one shown in FIGS. 4 and 5, the thickness of the second layer 22 increases in the same way as the thickness of the first layer 21 decreases along the variability direction X'. As a result, the overall thickness of the set comprising the first layer 21 and the second layer 22 is substantially constant.

The thickness of the outer layer 24 may be in the range of 0.1 to 0.2 mm.

In embodiments such as the one shown in FIGS. 4 and 5, the multilayer complex 20 further comprises a third layer 23 made of a hydrophobic aerogel, such as a silica gel. The third layer 23 may be adjacent the metallic foil 24, within the multilayer complex 20 (i.e. the metallic foil 24 forms the outer layer of the multilayer complex 20). It may have a substantially constant thickness. The maximum thickness—or uniform thickness—of the third layer 13 may be in the range of 1 to 5 mm, preferably in the range of 2 to 3 mm. Such a third layer 23 helps prevent the cold ambient air from cooling the pipe 10 and exhaust gases, especially in cold weather. The third layer 23 could be reduced or omitted, in particular, when the vehicle is used in warmer countries.

The overall thickness of the multilayer complex 20 may be in the range of 8 to 12 mm.

The arrangement of the layers in the multilayer complex 20, from the pipe 10, may be as follows:

- the first layer 21 forms the inner layer of the thermal insulating member 100;
- the second layer 22 is adjacent the first layer 21;
- the third layer 23 is adjacent the second layer 22;
- the metallic foil 24 is adjacent the third layer 23 and forms the outer layer of the thermal insulating member 100.

However, this arrangement, which is the one illustrated in FIGS. 4 and 5, should not be considered as limiting. In particular, the first layer 21 and the third layer 23 could be switched.

Having the first layer 21 arranged as the inner layer is advantageous in that the aerogel can efficiently resist heat loss despite the high temperature of the pipe 10.

Having the second layer 22 arranged as a middle layer can reduce the conduction from the aerogel and maintain thermal stability. Moreover, said second layer 22 is then protected on both sides by an aerogel, which minimizes the entry of water and fungi.

In the embodiment of FIG. 5, the first layer thickness decreases constantly along the whole length of the thermal insulating member 100, from the first end 31 to the second end 32. Thus, the first layer 21 comprises a face 25 which forms a tilted plane. Said face 25 here forms the interface between the first layer 21 and the second layer 22.

Other embodiments are described with reference to FIGS. 6 to 13. It has to be noted that the specific features of all illustrated embodiments can be combined, so that other variants can be contemplated.

In FIGS. 6 and 7, the multilayer complex 20 does not include a third layer 23. In FIG. 6, the second layer 22 is arranged between the first layer 21 and the outer layer 24; then, the first layer 21 is the inner layer. In FIG. 7, the first layer 21 is arranged between the second layer 22 and the outer layer 24; then, the second layer 22 is the inner layer. The first layer thickness decreases constantly along the whole length of the thermal insulating member 100, from the first end 31 to the second end 32. Thus, the first layer 21 comprises a face 25 which forms a tilted plane.

Figure 9:
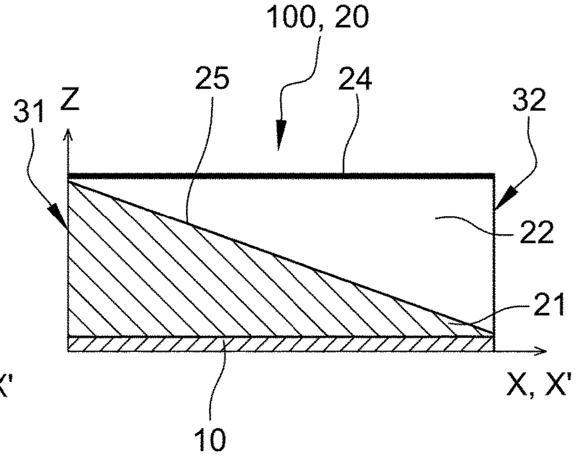
Figure 10:
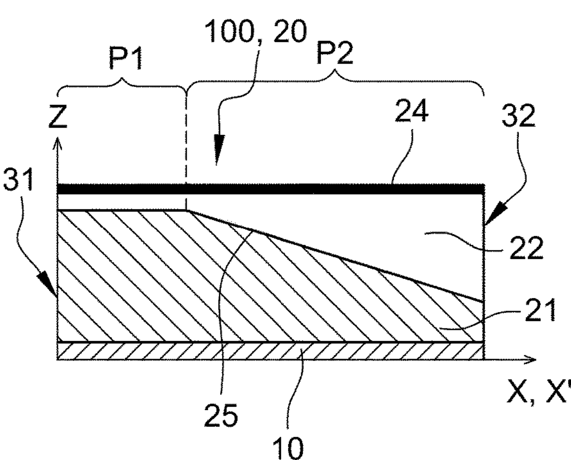

In an embodiment, at least one of the first and second ends 31, 32, the thickness of one of the first layer 21 and second layer 22 is zero. In FIG. 8, the thickness of the second layer 22 is zero at the first end 31. In FIG. 9, the thickness of the second layer 22 is zero at the first end 31 and the thickness of the first layer 21 is zero at the second end 32. The first layer 21 may comprise a face 25 which forms a tilted plane.

Figure 11:
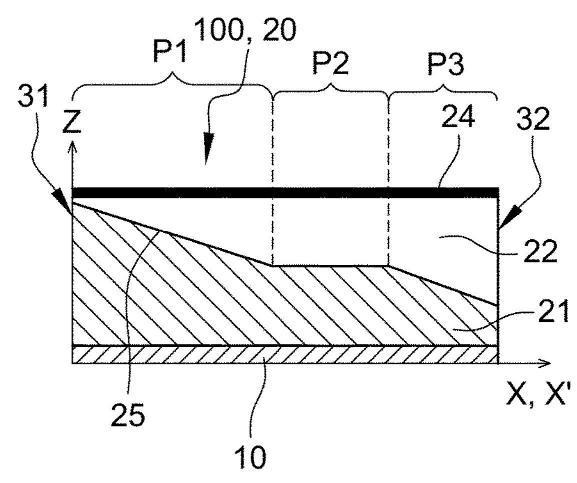
Figure 12:
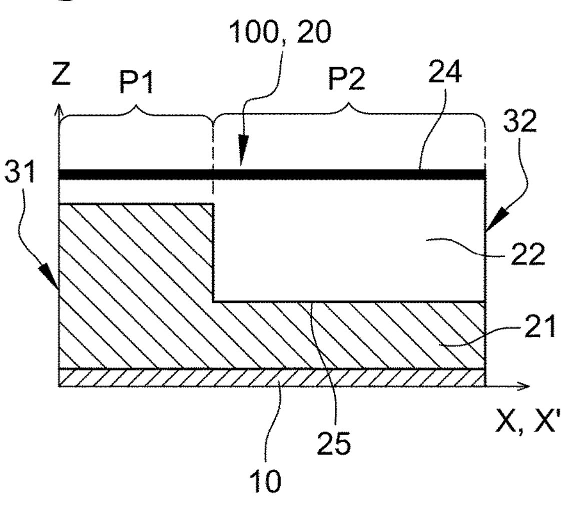

In an embodiment, the first layer 21 comprises a portion in which its thickness is substantially constant, along the direction X, X'. For example, from the first end 31 to the second end 32 of the thermal insulating member 100, the first layer 21 can comprise:

- a first portion P1 in which the thickness of the first layer 21 is substantially constant, and then a second portion P2 in which the thickness of the first layer 21 decreases, for example constantly (see FIG. 10);
- or, a first portion P1 in which the thickness of the first layer 21 decreases, for example constantly, then a second portion P2 in which the thickness of the first layer 21 is substantially constant, and finally a third portion in which the thickness of the first layer 21 decreases, for example constantly (see FIG. 11).

It has to be noted that several variants are possible. There may be provided a different number of portions from the first end 31 to the second end 32. The way the thickness of the first layer 21 varies may be different than the one illustrated in FIGS. 10 and 11. Although there is a continuity in successive portions in terms of thickness, alternatively the successive thicknesses can form a series of discrete values; in other words, the first layer 21 may comprise a face 25 which forms at least one step. Besides, the thickness of one of the first and second layers 21, 22 can be zero at one of the ends 31, 32.

Figure 13:
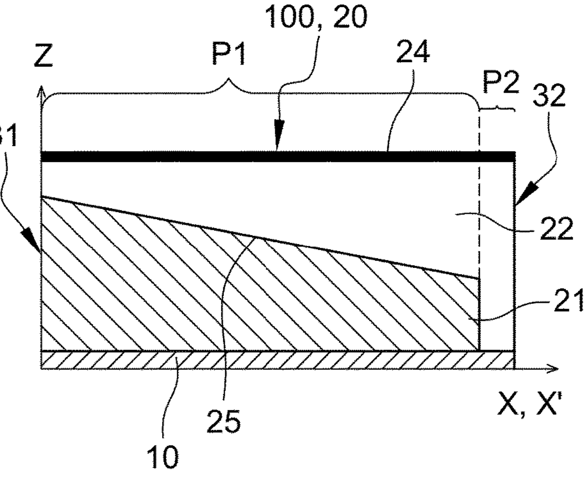

In an embodiment, the first layer thickness does not decrease continuously but by increments, at least over part of the length of the thermal insulating member 100, from the first end 31 to the second end 32. Thus, the first layer 21 comprises a face 25 which forms at least one step. For example, from the first end 31 to the second end 32 of the thermal insulating member 100, the first layer 21 can comprise:

- a first portion P1 in which the thickness of the first layer 21 is substantially constant, for example equal to e21-1, and then a second portion P2 in which the thickness of the first layer 21 is substantially constant, for example equal to e21-2 (see FIG. 12);
- or, a first portion P1 in which the thickness of the first layer 21 decreases, for example constantly, before decreasing according to a step to a lower value, for example zero, and then a second portion P2 in which the thickness of the first layer 21 is substantially constant and equal to said value (see FIG. 13). Thus, in FIG. 13, there is no first layer 21 in the second portion P2.

Thus, the invention makes it possible to improve the exhaust after treatment system performance by ensuring the exhaust gases temperature at the system inlet is as high as possible, due to reduced heat losses in the pipe 10. Such an improvement is achieved with a low financial impact, owing to the decreasing thickness of the most efficient, yet most expensive, insulating material, along the pipe length.

Tests have been conducted to compare the efficiency of the thermal insulating member of the invention with a conventional thermal insulating member comprising only fiber wool, when used on a pipe 10. The temperature drop from the first end 11 to the second end 12 of the pipe 10 was measured to be around 35° C. with the invention, and around 50° C. with the conventional thermal insulating member, which means an improvement of around 30%.

Other advantages of the invention include:

- highly reduced cost as compared to a thermal isolation provided only by an aerogel;
- ultra low weight;
- significant noise reduction, as aerogels have very low sound velocity through structure (~100 m/s) and are exceptional reflectors of audible sound, making excellent barrier materials.

It is to be understood that the present invention is not limited to the embodiments described above and illustrated in the drawings; rather, the skilled person will recognize that many changes and modifications may be made within the scope of the appended claims.

The invention claimed is:

1. A thermal insulating member for a vehicle component, comprising a multilayer complex having:

- a first layer which is made of a hydrophobic aerogel;
- a second layer which is made of a thermally insulating material that has small pockets of gas trapped in a fibrous or a foam structure, wherein the second layer is directly bonded to the first layer;
- a metallic foil, defining an outermost layer of the multilayer complex;

the multilayer complex defining a depth direction across the layers;

wherein a thickness of the first layer decreases along a variability direction of the multilayer complex which is orthogonal to the depth direction, at least over part of a dimension of the multilayer complex along said variability direction, wherein the thickness of the second layer increases in the same way as the thickness of the first layer decreases, along the variability direction, such that the overall thickness of the set comprising the first layer and the second layer is substantially constant.

2. The thermal insulating member according to claim 1, wherein the second layer is arranged between the first layer and the outermost layer or wherein the first layer is arranged between the second layer and the outermost layer.

3. The thermal insulating member according to claim 1, wherein the first layer comprises a portion in which its thickness decreases continuously along the variability direction, whereby in said portion the first layer comprises a face forming a slope without steps.

4. The thermal insulating member according to claim 1, wherein the first layer comprises a portion in which its thickness decreases constantly along the variability direction, wherein in said portion the first layer comprises a face forming a tilted plane.

5. The thermal insulating member according to claim 1, wherein the first layer comprises a portion in which its thickness is substantially constant along the variability direction.

6. The thermal insulating member according to claim 1, wherein the first layer comprises a portion in which its thickness decreases by increments, along the variability direction, wherein in said portion the first layer comprises a face forming at least one step.

7. The thermal insulating member according to claim 1, wherein in at least one portion of the multilayer complex, the thickness of the first layer is zero or the thickness of the second layer is zero.

8. The thermal insulating member according to claim 1, wherein the second layer is made of a mineral wool.

9. The thermal insulating member according to claim 1, wherein the metallic foil is an aluminum foil or a stainless steel foil.

10. The thermal insulating member according to claim 1, wherein the multilayer complex further comprises a third layer made of a hydrophobic aerogel, the second layer being arranged between the first layer and the third layer.

11. The thermal insulating member according to claim 10, wherein the maximum thickness of the third layer is in the range of 1 to 5 mm.

12. The thermal insulating member according to claim 1, wherein the hydrophobic aerogel is a silica gel.

13. The thermal insulating member according to claim 1, wherein:

- the maximum thickness of the first layer is in the range of 3 to 6 mm;
- and/or the maximum thickness of the second layer is in the range of 3 to 6 mm;
- and/or the thickness of the outermost layer is in the range of 0.1 to 0.2 mm.

14. The thermal insulating member according to claim 1, wherein the thermal insulating member is flexible so as to be wrapped around the vehicle component.

15. The thermal insulating member according to claim 1, wherein the thermal insulating member is formed as a shell configured to be placed around the vehicle component.

16. An assembly comprising:

a vehicle component having a first end and a second end opposite the first end along a longitudinal direction, wherein, in use, the first end has a first temperature and the second end has a second temperature lower than;

a thermal insulating member according to claim 1 which is arranged around the vehicle component with the outermost layer oriented outwardly and so that the variability direction of the multilayer complex is parallel the longitudinal direction and the greatest thickness of the first layer is closer to the first end.

17. The assembly according to claim 16, wherein, along the longitudinal direction, the multilayer complex comprises a first end on the side of the first end of the vehicle component and a second end on the side of the second end of the vehicle component, and wherein:

at the first end of the multilayer complex, the thickness of second layer is zero; and/or, at the second end of the multilayer complex, the thickness of first layer is zero.

18. The assembly according to claim 17, wherein the vehicle component is a pipe.

19. A vehicle comprising an engine, an exhaust gas treatment system and an assembly according to claim 17, wherein the vehicle component is a pipe which carries exhaust gases flowing from the engine towards the exhaust gas treatment system.

* * * * *